(12) United States Patent
Zitzmann et al.

(10) Patent No.: US 7,746,212 B2
(45) Date of Patent: Jun. 29, 2010

(54) TEMPERATURE SENSOR AND METHOD FOR ITS PRODUCTION

(76) Inventors: Heinrich Zitzmann, Bluetenweg 14, D-91207 Lauf an der Pegnitz (DE); Georg Bernitz, Vordere Marktstrasse 9, D-90441, Nuremberg (DE)

( * ) Notice: Subject to any disclaimer, the term of this patent is extended or adjusted under 35 U.S.C. 154(b) by 0 days.

(21) Appl. No.: 11/652,815

(22) Filed: Jan. 12, 2007

(65) Prior Publication Data

US 2007/0195066 A1 Aug. 23, 2007

Related U.S. Application Data

(63) Continuation of application No. PCT/EP2005/006744, filed on Jun. 22, 2005.

(30) Foreign Application Priority Data

Jul. 15, 2004 (DE) .................. 10 2004 034 185

(51) Int. Cl.
H01C 7/10 (2006.01)
(52) U.S. Cl. ...................................... 338/22 R; 338/25

(58) Field of Classification Search ................ 338/22 R
See application file for complete search history.

(56) References Cited

U.S. PATENT DOCUMENTS

| 3,982,218 | A | | 9/1976 | Adler et al. |
|---|---|---|---|---|
| 4,464,646 | A | * | 8/1984 | Burger et al. .................. 338/25 |
| 4,708,769 | A | * | 11/1987 | Burger et al. .................. 216/16 |
| 5,172,466 | A | | 12/1992 | Friese et al. |
| 5,181,007 | A | | 1/1993 | Friese et al. |
| 5,823,680 | A | | 10/1998 | Kato et al. |
| 6,595,050 | B2 | | 7/2003 | Kano et al. |
| 6,653,926 | B1 | * | 11/2003 | Zitzmann ..................... 338/25 |
| 2004/0075527 | A1 | | 4/2004 | Zitzmann et al. |

* cited by examiner

Primary Examiner—Lincoln Donovan
Assistant Examiner—Joselito Baisa
(74) Attorney, Agent, or Firm—Mayback & Hoffman PA; Gregory L. Mayback; Scott D. Smiley

(57) ABSTRACT

In a method for producing a temperature sensor, there is first provided a substrate, on the first surface of which there is arranged a sensor structure having a first end and a second end, wherein the sensor structure substantially completely covers the first surface of the substrate. Then an insulation layer is at least partially formed on this sensor structure on which a first and a second contact area are then formed. The first and second contact areas are formed such that they are conductively connected to the first end and the second end of the sensor structure, respectively.

18 Claims, 3 Drawing Sheets

TEMPERATURE SENSOR AND METHOD FOR ITS PRODUCTION

CROSS-REFERENCE TO RELATED APPLICATION

This is a continuing application, under 35 U.S.C. §120, of copending international application No. PCT/EP2005/006744, filed Jun. 22, 2005, which designated the United States; this application also claims the priority, under 35 U.S.C. §119, of German patent application No. 102004034185.0, filed Jul. 15, 2004; the prior applications are herewith incorporated by reference in their entirety.

BACKGROUND OF THE INVENTION

1. Field of the Invention

The present invention relates to a temperature sensor and to a method for its production and particularly to a temperature sensor, preferably a platinum temperature sensor, with space-saving contact terminals and a method for the production of such a temperature sensor.

2. Description of the Related Art

Platinum temperature sensors in thin-layer technology have been produced in various implementations for years.

German Patent Application DE 44445243 C2 describes a temperature sensor with a ceramic substrate, a resistance sensor embedded in the ceramic substrate and having a positive resistance temperature coefficient, two first lines connected to the resistance sensor and serving for current supply, two second lines connected to the resistance sensor, wherein the voltage drop at the resistance sensor may be detected by means of the two second lines, and a voltage divider resistor connected between the two second lines and in parallel to the resistance sensor, wherein the output signal voltage of the temperature sensor is present as partial voltage of the voltage divider resistor, and wherein two pads are further arranged on the surface of the ceramic substrate and connected to one of the two second lines and/or the voltage divider resistor.

German Patent Application DE 10232380 A1 describes a sensor with wire connection and a method for producing a sensor with wire connection, wherein the sensor comprises a first insulation layer, a second insulation layer with an opening, a plurality of metal conductive traces, and a plurality of electrodes, wherein each metal conductive trace includes a contact area and is arranged between the first and the second insulation layer, and wherein each electrode further includes a connection area arranged separate from the contact area, and wherein the electrodes are further in electrical connection with the contact areas through the openings.

German Patent Application DE 3733192 C1 describes a PTC temperature sensor and a method for the production of a PTC temperature sensor element for the PTC temperature sensor, wherein the PTC temperature sensor comprises two ceramic films and is designed such that the PTC resistive trace is hermetically encapsulated with respect to the measurement gas and the ambient air, and wherein the PTC resistive trace is further connected to the contact areas on the other side of the film through two punched vias.

With respect to FIGS. 1 and 2, a conventional method for the production of a platinum sensor according to an approach as it is known in prior art will be explained below in more detail. In FIGS. 1 and 2, the figure parts A each show top views of the temperature sensor, and the figure parts B each show side views. Such sensors are known from DE 10020932 C1.

In the conventional approach, as it is shown in FIG. 1, a sensor structure 12, preferably a meandering platinum resistive trace, is applied to a substrate 10. The resistive trace 12 has a first end 12a and a second end 12b. Furthermore, a first contact area 14 and a second contact area 16 are arranged on the substrate 10, wherein the first contact area 14 is connected to the first end 12a of resistive trace 12, and wherein the second contact area 16 is connected to the second end 12b of the resistive trace 12.

For the completion of the temperature sensor, as shown in FIG. 2, a first connecting wire 18 is affixed to the first contact area 14, and a second connecting wire 20 is affixed to the second contact area 16. Furthermore, a protective layer 22 is preferably applied over the resistive trace 12 (see FIG. 2B). The connecting wires 18, 20 are further preferably additionally fixed by means of a glaze 24 also partially covering the cover 22.

FIG. 3 also shows a conventional temperature sensor in which the temperature sensor element is of the SMD type. Unlike the embodiment described with respect to FIGS. 1 and 2, the resistive trace 12 is arranged on the substrate 10 such that the respective ends 12a and 12b of the resistive trace 12 are arranged adjacent to opposite ends of the substrate 10 at which there are also arranged the contact areas 14 and 16. Similarly to FIGS. 1 and 2, it may also be provided here to cover the resistive trace 12 with a protective layer 22 (see FIG. 3B).

The temperature sensors described with respect to FIGS. 1 to 3 have been produced in various implementations and used for precise temperature measurement tasks for years, as has been mentioned. The typical structure of these sensor elements, as described with respect to FIGS. 1 to 3, includes an $Al_2O_3$ ceramic substrate 10 on which a platinum film 12 having a thickness of about 1 µm is applied. The platinum film is further structured so that the resistive trace has a resistance in the order of, for example, 100 ohm. This platinum resistive trace 12 is usually protected by the protective layer 22 (for example a glaze layer). The connecting wires 18, 20 are generally welded to the two contact areas 14, 16, with the exception of SMD types, wherein the wires are additionally provided with the glaze drop 24 to allow mechanical stress on the connecting wires 18, 20 during further processing.

For years there has been a tendency in prior art that the thin-film sensor elements described by way of example with respect to FIGS. 1 and 2 have become smaller and smaller, having, for example, a width of 1 mm, a length of 1.5 mm and a height of 0.8 mm, or even smaller. This is accompanied by a simultaneous increase in the nominal resistance values, for example to 1,000 ohm or even higher.

In the implementations currently known, both the resistor structure and the contact zone for the application of connecting wires and/or, for SMD devices or SMD-like implementations, the contact zone and/or the contact pads are arranged on the same plane, i.e. on the substrate surface, as can be seen in FIGS. 1 to 3. With the increasing miniaturization and the simultaneously increasing requirement to generate a high nominal resistance value, ever finer structures (resistive traces) have to be created, wherein a certain area portion always has to be reserved for the two contact areas. These contact areas 14, 16 may occupy considerably more than 50% of the overall area of the surface of the substrate 10 in comparably short elements, because, for example, the wire structure on the chip may not become infinitely short for reasons of mechanical strength. This area portion is not available for the resistive structure and therefore has to be compensated for by very fine traces, i.e. small trace widths, because the thickness of the platinum film used and/or the metal film used may not be produced infinitely thin.

However, in the case of very fine trace widths, for example of less than 5 μm, the structuring becomes more and more difficult, because the planarity of the substrates or other spurious effects (e.g. very fine dust in spite of the clean room, minimal variations in the photoresist process) also have a more and more negative effect and result in less yield.

SUMMARY OF THE INVENTION

It is the object of the present invention to provide an improved temperature sensor and a method for its production, wherein the requirements of increasing miniaturization and simultaneous increase of the nominal resistance values may be met with simultaneous guarantee of good connecting contacts and avoidance of too fine trace widths when producing the resistive structure.

In accordance with a first aspect, the present invention provides a temperature sensor, having a substrate; a sensor structure arranged on a first surface of the substrate, wherein the sensor structure includes a first end and a second end; an insulation layer at least partially arranged on the sensor structure; and a first and a second contact area arranged on the insulation layer and conductively connected to the first end and the second end of the sensor structure, respectively; wherein the sensor structure substantially completely covers the first surface of the substrate.

Preferably, the insulation layer includes a first and a second opening filled with conductive material, wherein the conductive material contacts both the two ends of the sensor structure and the corresponding contact areas.

Preferably, a third and a fourth contact area are provided on the surface of the substrate, the areas having smaller dimensions than the first and the second contact area, wherein the third and the fourth contact area are connected to the first and the second end of the sensor structure, respectively. The thickness of the insulation layer is preferably in the range between 0.01 mm (10 μm) and 0.2 mm. If the insulation layer is, for example, applied by vapor deposition, the thickness may be thinner, for example in the range of 1 μm. The sensor structure preferably includes a metal film, for example in meandering shape, with a thickness of, for example, between 0.1 μm and 3 μm. The insulation layer is preferably formed by a glaze, a glass ceramic, a ceramic or a combination thereof.

According to a further embodiment, the temperature sensor additionally includes first and second connecting wires affixed on the corresponding first and second contact areas. In accordance with a second aspect, the present invention provides a method for producing a temperature sensor, having the steps of (a) providing a substrate on the first surface of which there is arranged a sensor structure having a first end and a second end, wherein the sensor structure substantially completely covers the first surface of the substrate; (b) forming an insulation layer at least partially on the sensor structure; and (c) forming a first and a second contact area on the insulation layer such that they are conductively connected to the first end and the second end of the sensor structure, respectively.

Preferably, the step of forming the insulation layer includes forming it with a first and a second open area, corresponding to the position of the two ends of the sensor structure on the substrate. The formation of the contact areas preferably includes applying a conductive paste and/or a conductive material, wherein the application of the conductive material also includes filling the two open areas in the insulation layer.

According to a further preferred embodiment, the method additionally includes the step of applying two connecting wires at the corresponding contact areas, wherein it may further be provided to apply a glaze to the portions of the connecting wires affixed to the contact areas.

The present invention thus provides a temperature sensor and a method for its production, wherein the space requirements in the contact zones in the film plane, i.e. in the plane in which the sensor structure is formed, are minimized so that more space is simultaneously available for the resistive structures and/or the sensor structure substantially completely covers the first surface of the substrate for the same chip size.

BRIEF DESCRIPTION OF THE DRAWINGS

Preferred embodiments of the present invention will be explained in more detail in the following with respect to the accompanying drawings, in which:

FIG. 1 shows a conventional temperature sensor in thin-film technology after a first production step, wherein

FIG. 2 shows a top view of the temperature sensor shown in FIG. 1 after a further production step, wherein

FIG. 3 is an illustration of a temperature sensor of the SMD type, wherein

FIG. 4 is an illustration of a first embodiment of the inventive temperature sensor after a first production step, wherein

FIG. 5 is an illustration of the temperature sensor of FIG. 4 after a further production step, wherein

FIG. 6 is an illustration of the temperature sensor of FIG. 5 after a further production step, wherein FIG. 7 shows a temperature sensor according to a further embodiment of the present invention of the SMD type, wherein

DESCRIPTION OF THE PREFERRED EMBODIMENTS

Figure 1A:
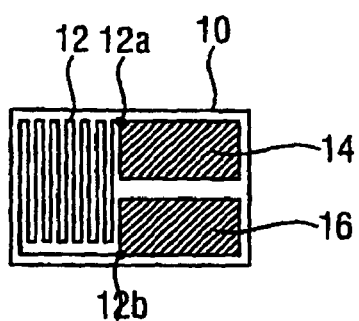
FIG. 1A shows a top view and FIG. 1B shows a side view.
Figure 1B:
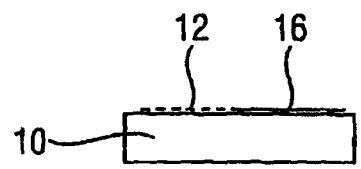
Figure 2A:
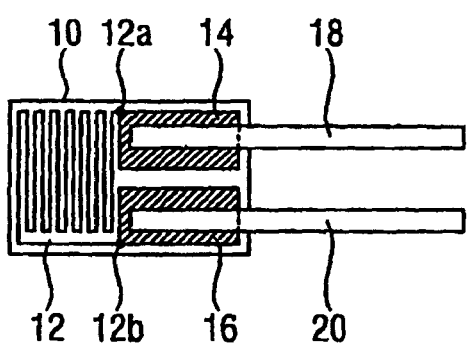
FIG. 2A shows a top view and FIG. 2B shows a side view.
Figure 2B:
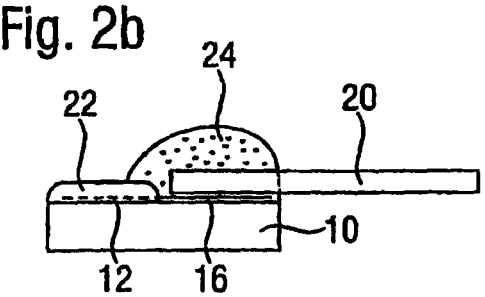
Figure 3A:
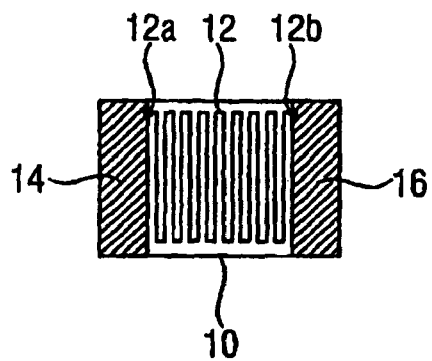
FIG. 3A shows a top view and FIG. 3B shows a side view.
Figure 3B:
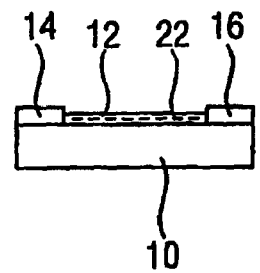
Figure 5A:
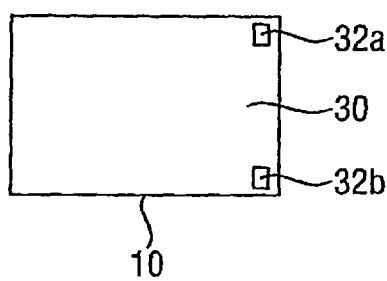
FIG. 5A shows a top view and FIG. 5B shows a side view.
Figure 5B:
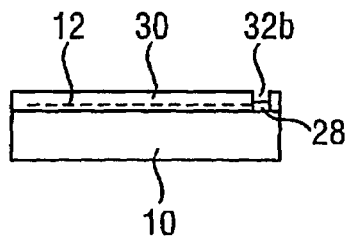
Figure 6A:
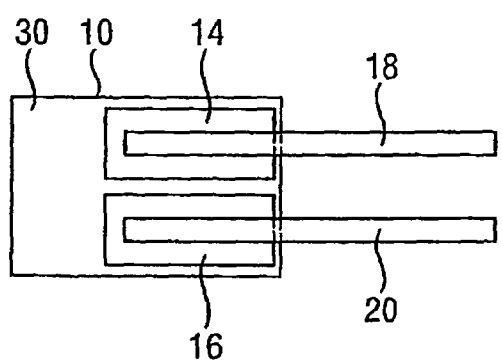
FIG. 6A shows a top view and FIG. 6B shows a side view.
Figure 6B:
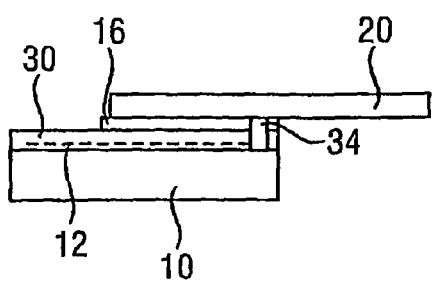
Figure 7A:
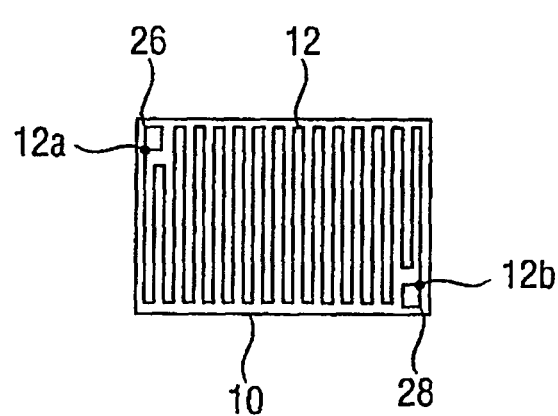
FIG. 7A shows a top view and FIG. 7B shows a side view.
Figure 7B:
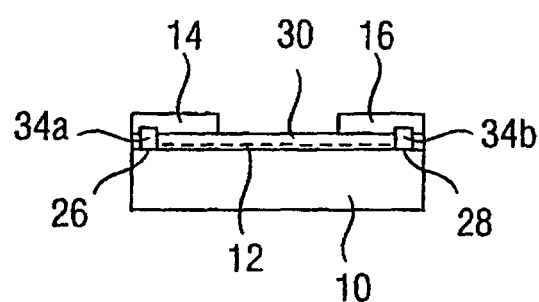

In the following description of the preferred embodiments, the same reference numerals are used for the same elements or elements functioning in the same way, wherein the elements already described with respect to FIGS. 1 to 3 that are also to be found in FIGS. 5 to 7 are provided with the same reference numerals.

With respect to FIGS. 4 to 6, a first embodiment of the inventive method for producing a temperature sensor and a first embodiment of the produced temperature sensor will be explained in more detail in the following. The figure parts A each show a top view illustration of the temperature sensor, and the figure parts B each show a side view.

Figure 4A:
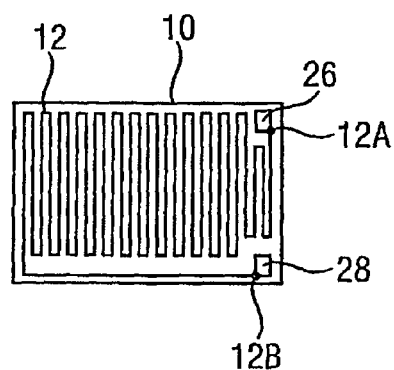
FIG. 4A shows a top view and FIG. 4B shows a side view.
Figure 4B:
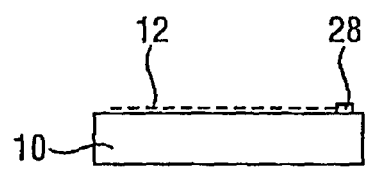

FIG. 4 shows a first embodiment of the temperature sensor according to the present invention after a first production step. The temperature sensor includes the substrate 10 on whose first surface there is formed a resistive film 12 having a first end 12a and a second end 12b. As can be seen from FIG. 4A, the resistive structure 12 is formed such that it substantially covers the whole upper surface of the substrate 10, and only at the ends 12a and 12b of the resistive structure small contact areas 26, 28 are provided.

In a subsequent method step in the described preferred embodiment, an insulation layer 30 is applied to the resistive trace 12 such that the whole first surface of the substrate 10 and the resistive structure 12 are covered. In the insulation layer 30, two openings 32a, 32b are arranged at positions corresponding to the positions of the small contact areas 26, 28 in the resistive element plane, i.e. on the first surface of the substrate 10.

In a subsequent step, as can be seen in FIG. 6, the first contact area 14 and the second contact area 16 are arranged on the insulation layer 30, wherein conductive material is also introduced into the openings 32a, 32b to ensure contacting of the contact areas 14 and 16 with the small pads 26 and 28, respectively, in the resistive element plane via a conductive connection 34 in the openings. Additionally, it may be provided to fix connecting wires 18, 20 to the contact areas 14, 16, and it may further be provided to additionally provide a glaze for fixing the connecting wires (not shown).

FIG. 7 shows the application of the inventive approach to temperature sensors of the SMD type. In this case, via small pads 26, 28, the ends of the resistive trace 12 are also connected to the large-area contact areas 14, 16 formed on the insulation layer 30 via the conductive connections 34a, 34b in the insulation layer 30.

According to the invention, it is possible to use the whole area of the substrate 10 for the resistive meander 12. In the preferred embodiments, only two very small contact areas 26, 28 (considerably smaller than the size of the contact areas used in prior art) are provided for continuing the contacts in a plane above the resistive meander. The small contact areas 26, 28 have, for example, dimensions of 0.1 mm to 0.3 mm, and the large contact areas 14, 16 have, for example, dimensions of 1 mm to 3 mm. For square contact areas, the result is thus an area ratio between the large contact areas 14, 16 and the small contact areas 26, 28 of about 100. This means that, unlike prior art, only ¹⁄₁₀₀ of the area on the substrate surface is required for the contact areas.

The resistive meander 12 will be two-dimensionally coated with any suitable dielectric layer 30, for example a suitable refractory glaze with the screen-printing method. By means of the openings 32a, 32b, the comparably very small contact areas 26, 28 remain free, i.e. they are not covered by the insulation layer 30.

This insulation layer and/or dielectric layer 30 is sized so that it has a sufficient thickness and density with respect to the metallization layer to be applied thereon for the contact areas 14, 16, which is applied in the plane above the dielectric layer 30, unlike prior art. The metallization 14, 16 may be applied, for example, by screen printing or another suitable method, for example electrochemical deposition, in the form of any contact areas. Prior to applying the contact area 14 and/or 16, a conductive material 34, 34a, 34b is introduced into the openings 32a, 32b in the insulation layer 30, for example by filling the openings with a metal paste, to thus ensure a conductive connection between the contact areas in the plane of the resistive meander and in the plane above the insulation layer.

Both the dielectric layer and the metallization 14, 16 arranged thereon may be applied by means of thick-layer processes (screen print plus burning in the pastes) or also by other technologies (e.g. vapor deposition), depending on the process suitable for the respective application.

Any suitable insulation material may be used as material for the dielectric layers, for example refractory glazes, glass ceramic, ceramic, for example vapor-deposited $Al_2O_3$, or also combinations of these layers, for example an $Al_2O_3$ layer plus glaze. The thickness of the insulation layer depends on the application of the temperature sensor and is in the range of micrometers to about 0.2 mm.

The metallization 14, 16 may be used, for example, through gold, platinum, silver, nickel, copper or suitable alloys, for example Ag/Pt, Ag/Pd, Au/Pt, etc., or combinations, for example Ag/Pt plus Au, etc., in layers of less than 1 μm up to several 100 μm.

After these process steps have been performed, further production process steps of the devices, wiring, SMD implementation may be performed as for elements with conventional contact zones.

The shape and size of the metallization pads 14, 16 in the plane above the dielectric 30 may be designed in any way and are not limited to the embodiments described above.

As shown by the above discussion, the present invention is advantageous, because a higher yield may be achieved, in addition to an improved mechanical and electrical contacting due to the improved and enlarged contact zones.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A temperature sensor, comprising:
   a substrate;
   a sensor structure arranged on a first surface of the substrate, wherein the sensor structure includes a length of a meander-shaped resistive film having a first end and a second end;
   an insulation layer at least partially arranged on the sensor structure and the first surface of the substrate;
   a first and a second contact area arranged on the insulation layer;
   a third and a fourth contact area arranged on the first surface of the substrate and in conductive connection with the first and the second end of the resistive film, respectively, and in conductive connection with the first and the second contact area on the insulation layer, respectively, wherein the first and the second contact areas have a surface dimension at least 2 times greater than a corresponding surface dimension of the third and fourth contact areas; and
   wherein the length of resistive film of the sensor structure substantially completely covers the first surface of the substrate.

2. The temperature sensor of claim 1, wherein the insulation layer includes a first and a second opening filled with conductive material, wherein the conductive material is in contact with the first end and the second end of the sensor structure and with the first contact area and the second contact area.

3. The temperature sensor of claim 1, wherein the insulation layer has a thickness between 1 μm and 0.2 mm.

4. The temperature sensor of claim 1, wherein the sensor structure includes a metal film having a thickness between 0.1 μm and 3 μm.

5. The temperature sensor of claim 1, wherein the insulation layer includes a glaze, a glass ceramic, a ceramic and combinations thereof.

6. The temperature sensor of claim 1, comprising:
   a first and a second connecting wire affixed on the first and the second contact area, respectively.

7. The temperature sensor of claim 1, wherein the third and fourth contact areas are disposed at a common edge of the substrate such that a part of the resistive film is disposed between the third and the fourth contact areas at said common edge.

8. The temperature sensor of claim 7, wherein the at least two of the plurality of short line portions of the resistive film are disposed at one edge with a line segment extending parallel to said one edge to one of the contact areas being positioned between the at least two of the plurality of short line portions and said one edge.

9. The temperature sensor of claim 1, wherein the third and fourth contact areas are disposed at opposite corners of the substrate.

10. A method for producing a temperature sensor, comprising:
  (a) providing a substrate on the first surface of which there is arranged a sensor structure having a length of resistive film with a first end and a second end, wherein the length of resistive film of the sensor structure substantially completely covers the first surface of the substrate;
  (b) forming a third and a fourth contact area on the first surface of the substrate and in connection with the first and the second ends of the sensor structure, respectively;
  (c) forming an insulation layer at least partially on the sensor structure and the first surface of the substrate; and
  (d) forming a first and a second contact area on the insulation layer such that they are conductively connected to the third and fourth contact areas of the sensor structure, respectively, and wherein the first and the second contact areas have a surface dimension at least 2 times greater than a corresponding surface dimension of the third and fourth contact areas.

11. The method of claim 10, wherein, in step (b), the insulation layer is formed with a first and a second open area, corresponding to the position of the first and the second end of the sensor structure, respectively, and wherein, in step (c), the first and the second contact area are formed by applying a conductive material, wherein the application of the conductive material includes filling the first and the second open area of the insulation layer with a conductive material.

12. The method of claim 10, wherein the insulation layer has a thickness between 1 µm and 0.2 mm.

13. The method of claim 10, wherein the insulation layer includes a glaze, a glass ceramic, a ceramic and combinations thereof.

14. The method of claim 10, having the following step after step (c):
  (d) affixing a first and a second connecting wire to the first and the second contact area, respectively.

15. The method of claim 14, having the following step after step (d):
  (e) applying a glaze covering at least partially the portions of the connecting wires affixed to the first and second contact areas.

16. The method of claim 10, wherein, in step (a), the third and fourth contact areas are formed at a common edge of the substrate such that a part of the resistive film is disposed between the third and the fourth contact areas at said common edge.

17. The method of claim 16, wherein the at least two of the plurality of short line portions of the resistive film are disposed at one edge with a line segment extending parallel to said one edge to one of the contact areas being positioned between the at least two of the plurality of short line portions and said one edge.

18. The method of claim 10, wherein, in step (a), the third and fourth contact areas are formed at opposite corners of the substrate.

* * * * *